(12) United States Patent
Yasuzawa et al.

(10) Patent No.: US 10,768,187 B2
(45) Date of Patent: Sep. 8, 2020

(54) AUTOMATIC ANALYSIS DEVICE AND SPECIMEN INSPECTION AUTOMATION SYSTEM

(71) Applicant: HITACHI HIGH-TECHNOLOGIES CORPORATION, Tokyo (JP)

(72) Inventors: Kenichi Yasuzawa, Tokyo (JP); Tsuguhiko Sato, Tokyo (JP); Hiroki Mori, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 240 days.

(21) Appl. No.: 15/743,332

(22) PCT Filed: Jun. 15, 2016

(86) PCT No.: PCT/JP2016/067784
§ 371 (c)(1),
(2) Date: Jan. 10, 2018

(87) PCT Pub. No.: WO2017/033537
PCT Pub. Date: Mar. 2, 2017

(65) Prior Publication Data
US 2018/0203027 A1    Jul. 19, 2018

(30) Foreign Application Priority Data

Aug. 25, 2015  (JP) ................................ 2015-165731

(51) Int. Cl.
*G01N 35/00* (2006.01)
*G01N 15/06* (2006.01)
(Continued)

(52) U.S. Cl.
CPC ....... *G01N 35/00623* (2013.01); *G01N 15/06* (2013.01); *G01N 35/00* (2013.01);
(Continued)

(58) Field of Classification Search
CPC ......... G01N 35/00623; G01N 35/0063; G01N 35/026; G01N 35/00; G01N 35/00732;
(Continued)

(56) References Cited

U.S. PATENT DOCUMENTS

2003/0220761 A1    11/2003  Biwa
2005/0036913 A1*    2/2005  Yamakawa ...... G01N 35/00594
                                        422/65
(Continued)

FOREIGN PATENT DOCUMENTS

JP      01-219564 A    9/1989
JP    2004-045396 A    2/2004
(Continued)

OTHER PUBLICATIONS

International Search Report of PCT/JP2016/067784 dated Sep. 6, 2016.
(Continued)

*Primary Examiner* — Benjamin R Whatley
*Assistant Examiner* — Curtis A Thompson
(74) *Attorney, Agent, or Firm* — Mattingly & Malur, PC

(57) ABSTRACT

In order to easily identify a specimen to be extracted because, for example, an item remains uninspected, from a rack 31 collected in a storage part 13 or the rack 31 taken out from the storage part, a camera of a smart device takes an image of the rack; and a calculation unit included in the smart device provides a mark, by AR technology, at the position of a specimen to be extracted. For example, the item that remains uninspected is identified on the basis of information about a combination of a rack ID and an identifier and information, which is received from an operation unit about specimens at respective positions. Thus, irrespective of a place or whether the specimen to be extracted is inside or outside of the device, the specimen to be extracted can be (Continued)

reliably specified from a plurality of specimen containers provided on a holder.

11 Claims, 11 Drawing Sheets

(51) Int. Cl.
*G01N 35/02* (2006.01)
*B01F 15/00* (2006.01)
*G05B 23/02* (2006.01)

(52) U.S. Cl.
CPC . *G01N 35/00603* (2013.01); *G01N 35/00732* (2013.01); *G01N 35/02* (2013.01); *G01N 35/026* (2013.01); *B01F 15/00305* (2013.01); *G01N 35/00584* (2013.01); *G01N 35/00722* (2013.01); *G01N 35/00871* (2013.01); *G01N 2035/0091* (2013.01); *G01N 2035/00633* (2013.01); *G01N 2035/00742* (2013.01); *G01N 2035/00821* (2013.01); *G01N 2035/00881* (2013.01); *G05B 23/0294* (2013.01); *G05B 2219/00* (2013.01); *G05B 2219/14095* (2013.01); *G05B 2219/15042* (2013.01); *G05B 2219/23291* (2013.01); *G05B 2219/26* (2013.01); *G05B 2219/2657* (2013.01); *G05B 2219/31115* (2013.01); *G05B 2219/31124* (2013.01); *G05B 2219/31447* (2013.01); *G05B 2219/31472* (2013.01); *G05B 2219/32351* (2013.01); *G05B 2219/33112* (2013.01); *G05B 2219/33333* (2013.01); *G05B 2219/35312* (2013.01); *G05B 2219/37577* (2013.01)

(58) Field of Classification Search
CPC .................. G01N 15/06; G01N 35/02; G01N 2035/00633; G01N 2035/00871; G01N 35/00722; G01N 35/00584; G01N 2035/00742; G01N 2035/0091; G01N 2035/00821; G05B 2219/14095; G05B 2219/15042; G05B 2219/31447; G05B 2219/35312; G05B 2219/32351; G05B 2219/31472; G05B 2219/33112; G05B 23/0294; G05B 2219/23291; G05B 2219/37577; G05B 2219/2219; G05B 2219/33333; G05B 2219/31115; G05B 2219/31124; G05B 2219/00; G05B 2219/26; G05B 2219/2657; B01F 15/00305

See application file for complete search history.

(56) References Cited

U.S. PATENT DOCUMENTS

| | | | |
|---|---|---|---|
| 2005/0187733 | A1 | 8/2005 | Staab |
| 2008/0286158 | A1* | 11/2008 | Watanabe .......... G01N 35/1009 422/400 |
| 2012/0109531 | A1* | 5/2012 | Knafel ............. G01N 35/00871 702/19 |
| 2013/0129166 | A1* | 5/2013 | Muller ................ B01D 21/262 382/128 |
| 2014/0080129 | A1* | 3/2014 | Klunder ................ C12Q 1/68 435/6.12 |
| 2014/0242612 | A1* | 8/2014 | Wang .................. G01N 21/253 435/7.23 |
| 2015/0099306 | A1 | 4/2015 | Ku |
| 2015/0154751 | A1 | 6/2015 | Satish et al. |
| 2016/0266157 | A1* | 9/2016 | Suzuki ................ G01N 33/491 |

FOREIGN PATENT DOCUMENTS

| | | |
|---|---|---|
| JP | 2013-228233 A | 11/2013 |
| JP | 2014-032620 A | 2/2014 |
| JP | 2014-532880 A | 12/2014 |
| JP | 2015-523113 A | 8/2015 |

OTHER PUBLICATIONS

International Preliminary Report on Patentability received in corresponding International Application No. PCT/JP2016/067784 dated Mar. 1, 2018.

* cited by examiner

[Fig. 1]
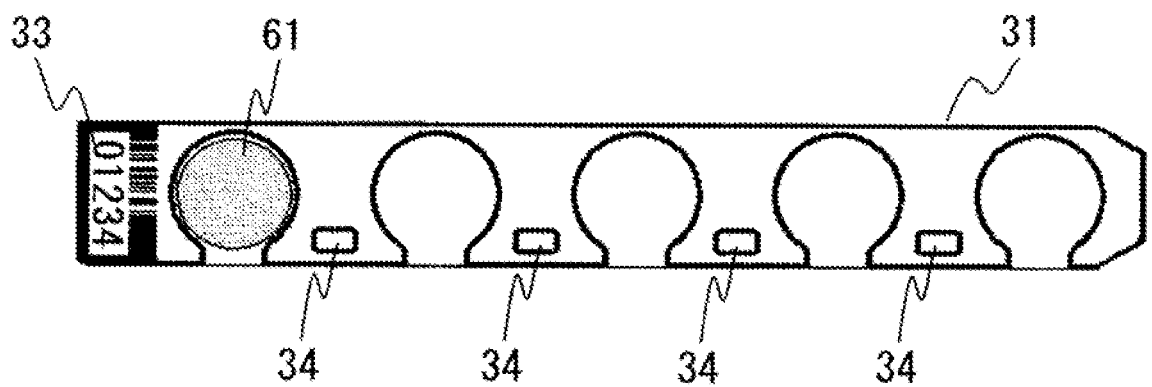
[Fig. 2]
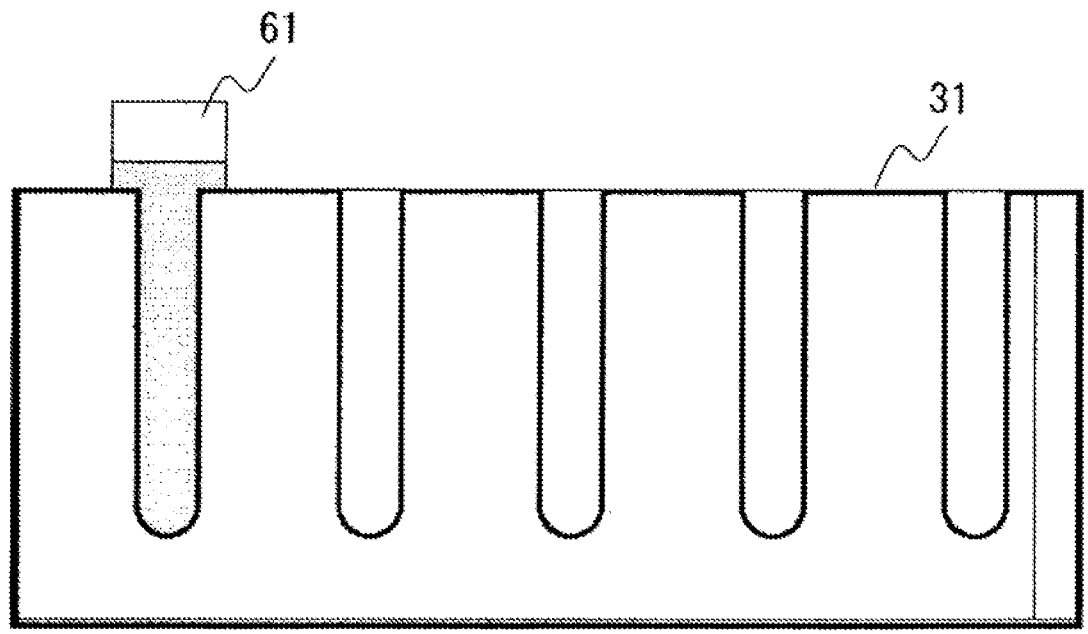

[Fig. 3]
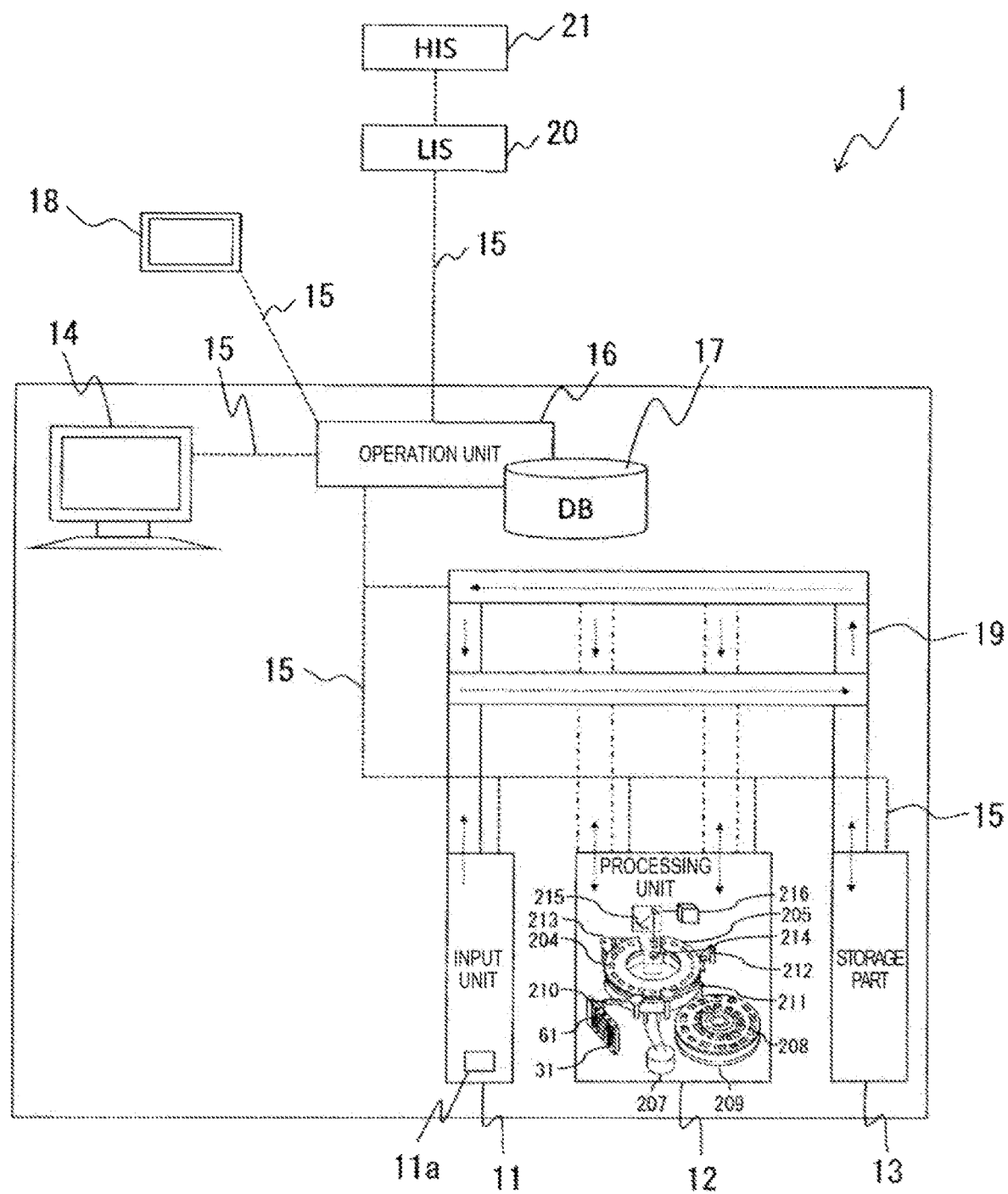

[Fig. 4]
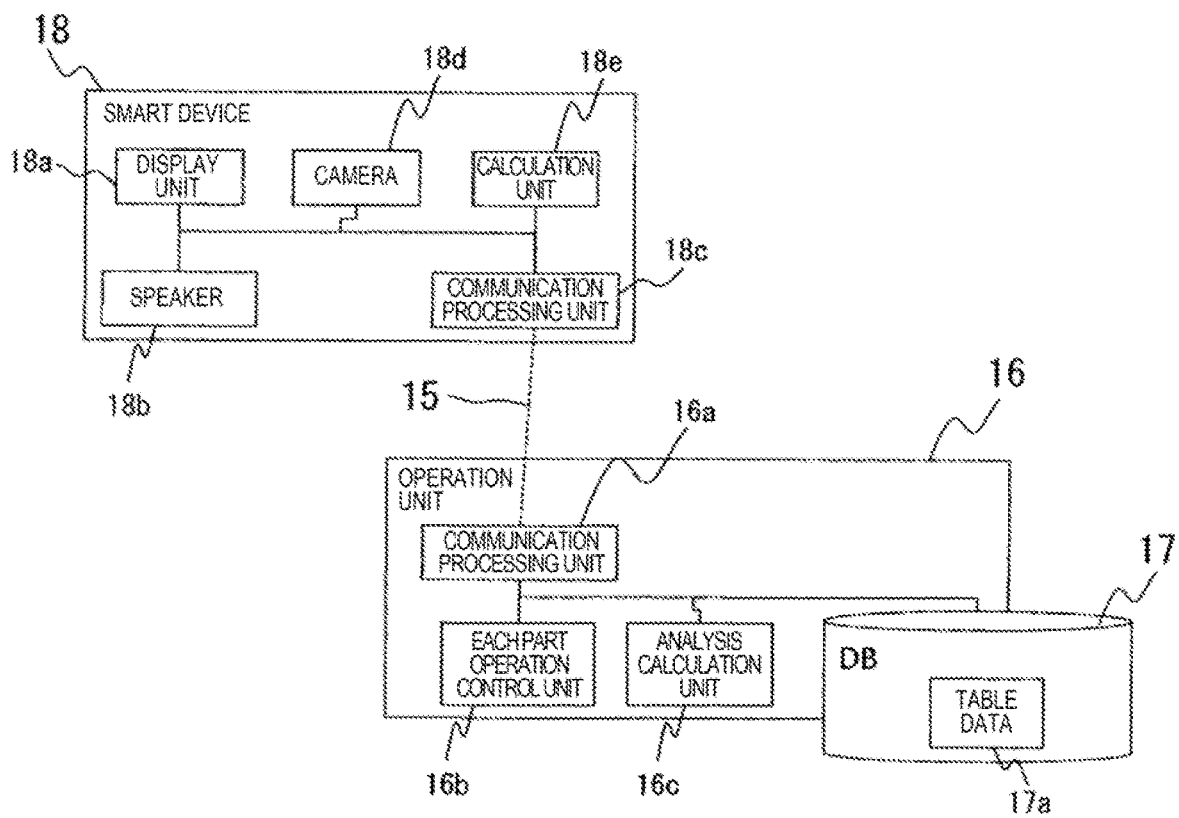
[Fig. 5]
| SPECIMEN ID | RACK ID | IDENTIFIER | ... | RE-INSPECTION FLAG | UNINSPECTION FLAG | ADDITIONAL INSPECTION FLAG | INSPECTION-REQUIRED ITEM | ... |
|---|---|---|---|---|---|---|---|---|
| abcde | 01234 | 1 | ... | × | × | × | — | ... |
| bcdef | 01234 | 3 | ... | ○ | × | × | A,B,D | ... |
| ... | ... | ... | ... | ... | ... | ... | ... | ... |
| fghij | 01345 | 2 | ... | × | ○ | × | C | ... |
| ... | ... | ... | ... | ... | ... | ... | ... | ... |
| klmno | 01456 | 1 | ... | × | × | × | — | ... |
| ... | ... | ... | ... | ... | ... | ... | ... | ... |

[Fig. 6]
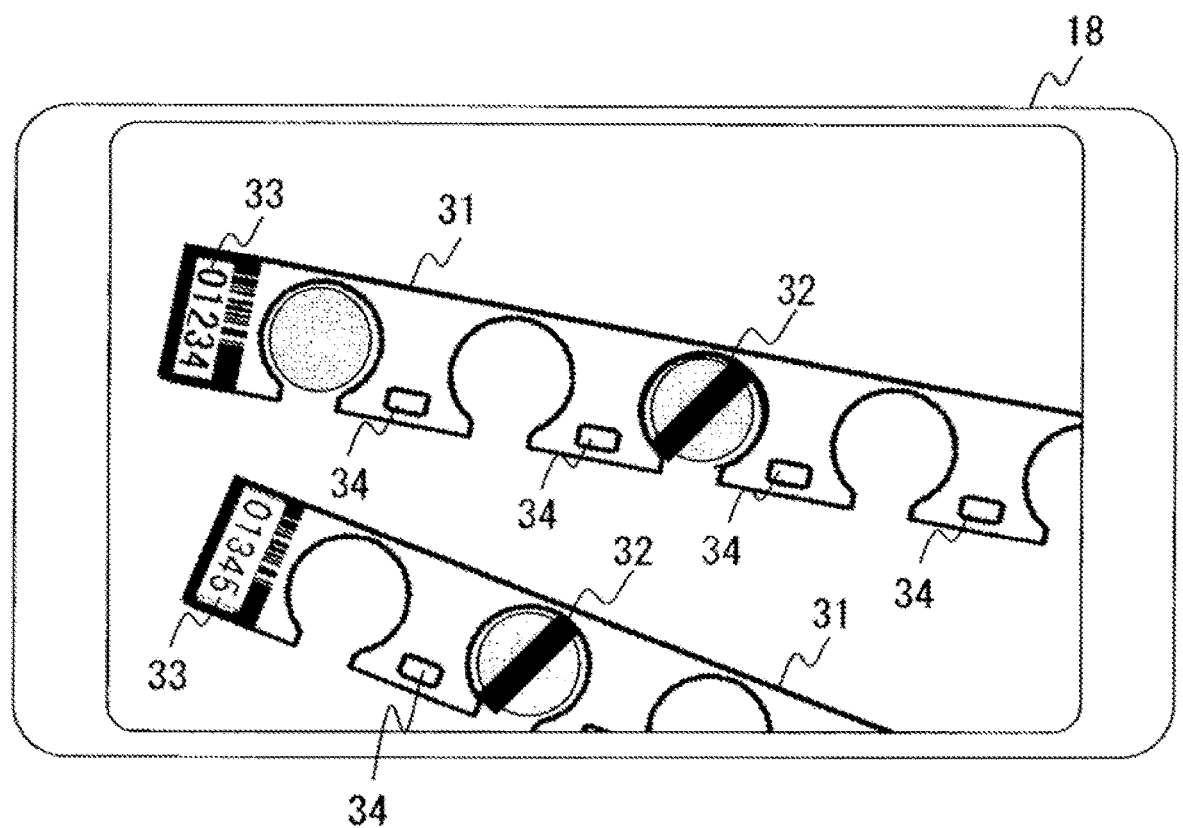

[Fig. 7]
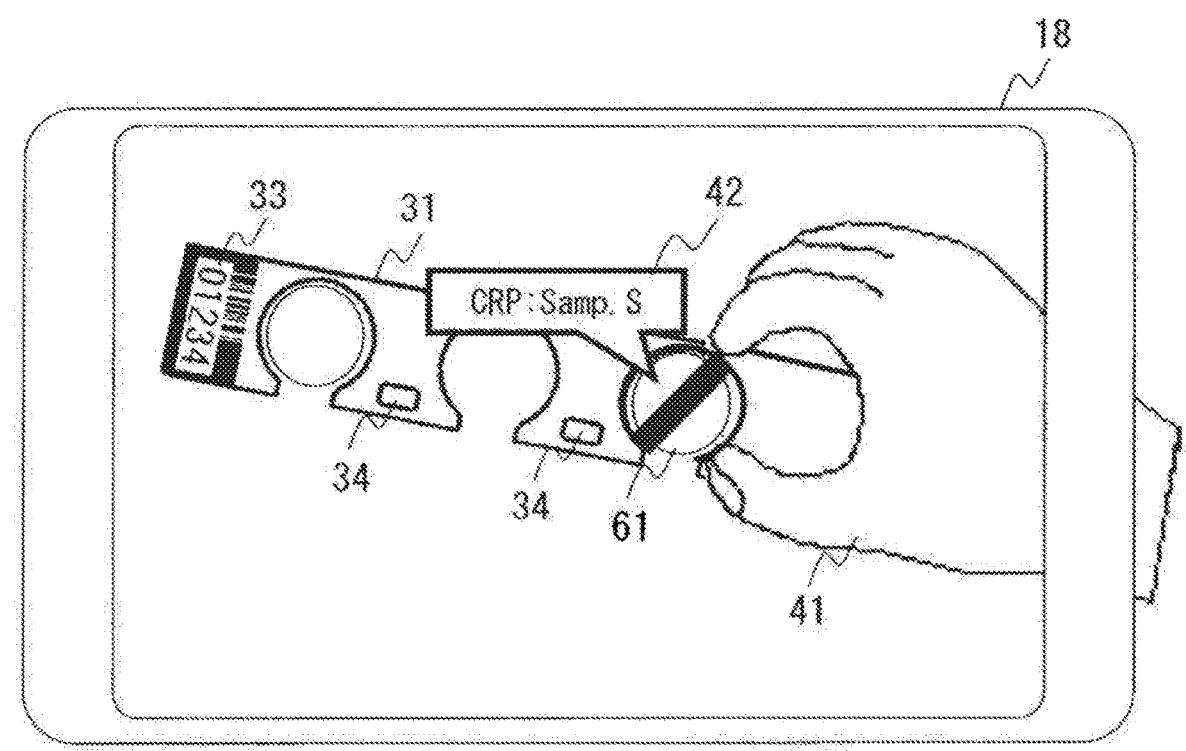

[Fig. 8]
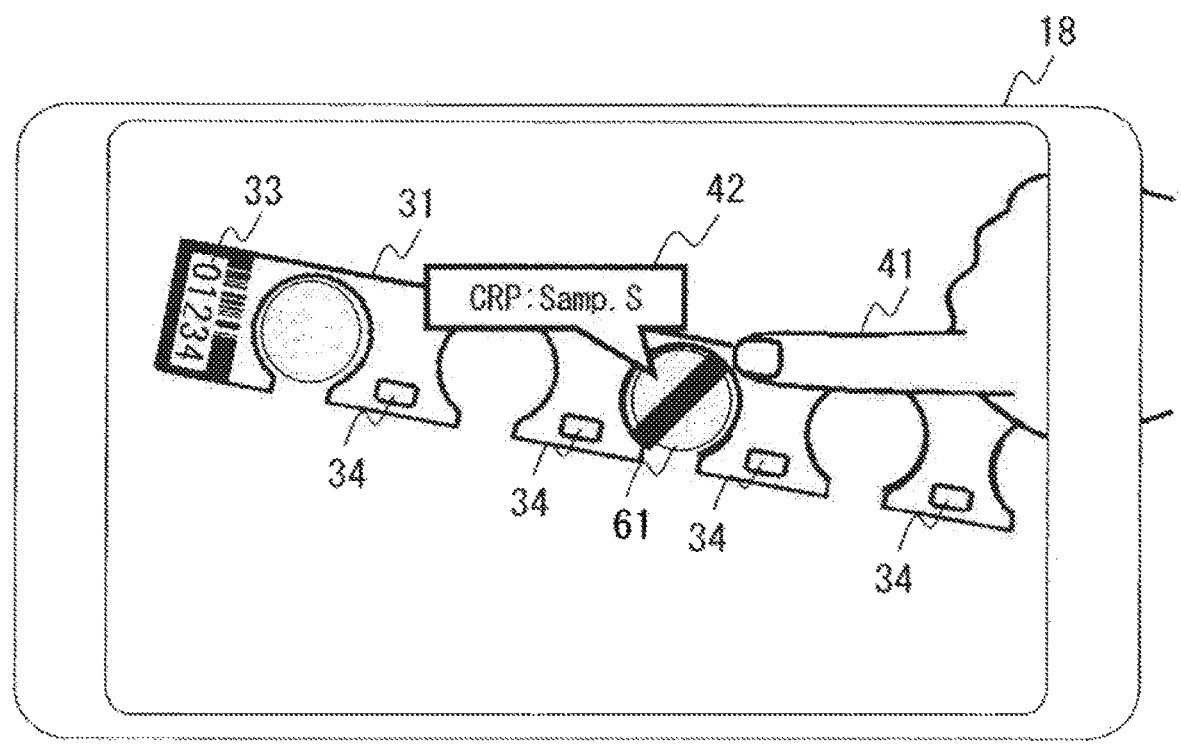

[Fig. 9]
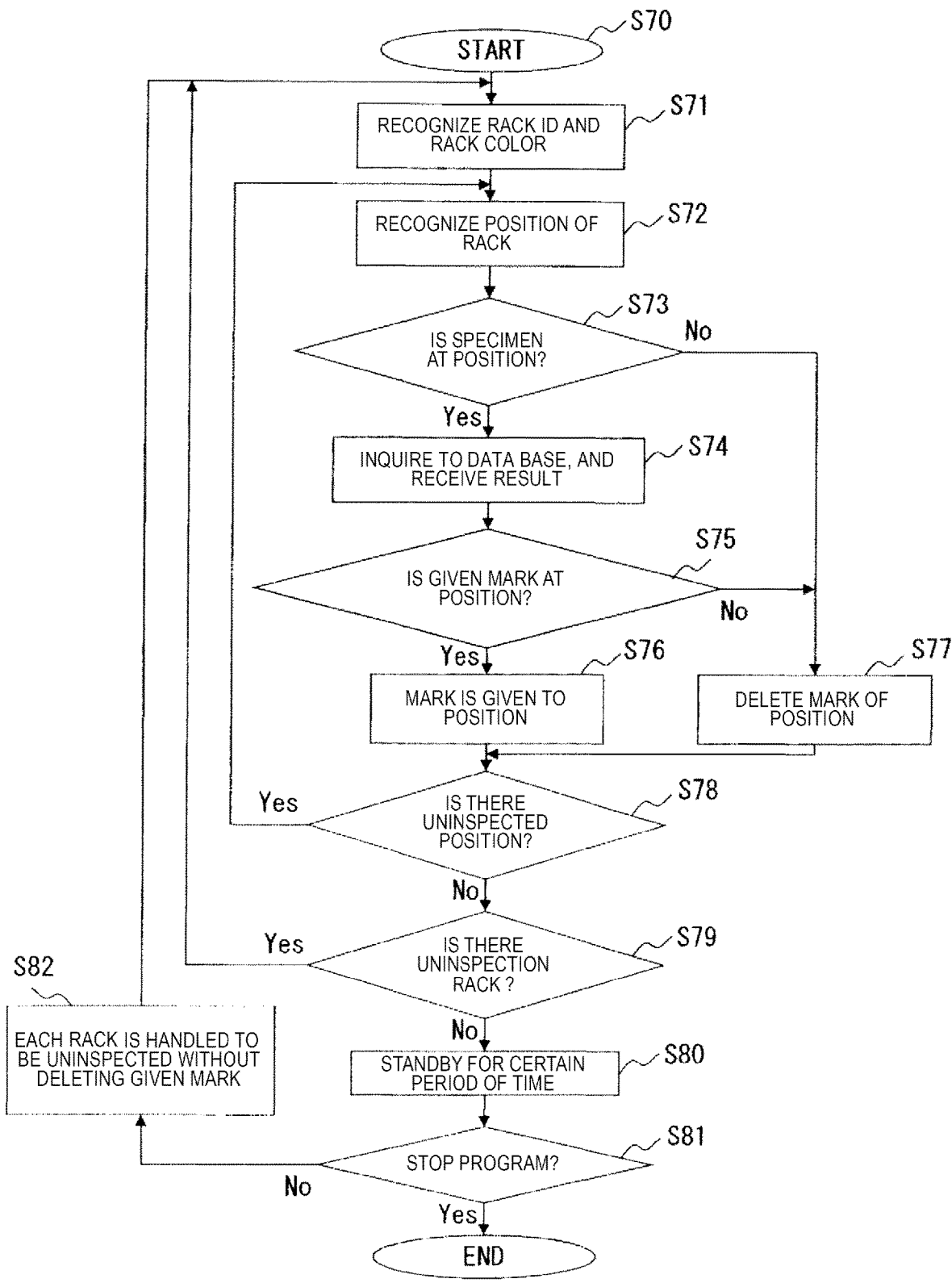

[Fig. 10]
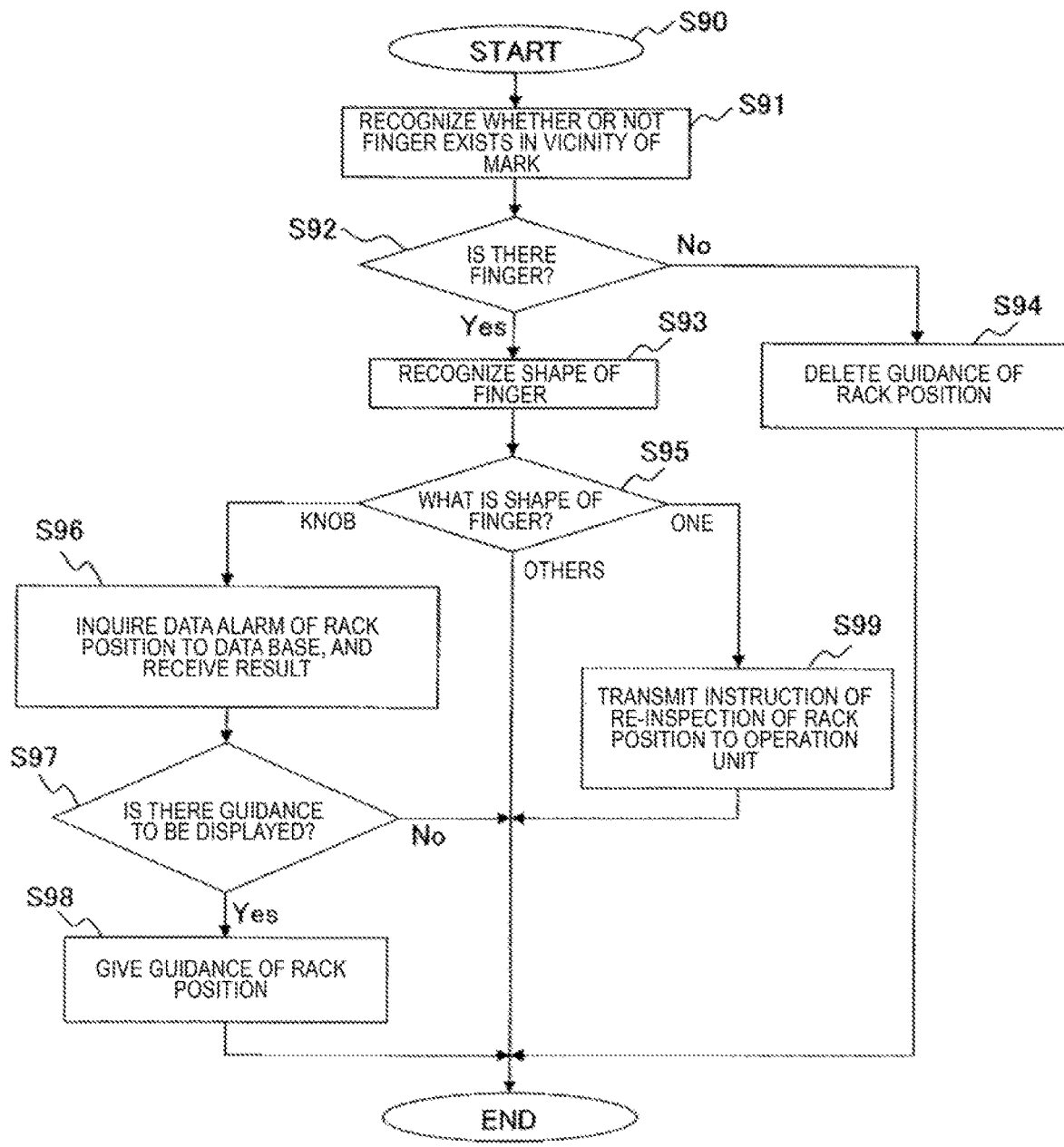

[Fig. 11]
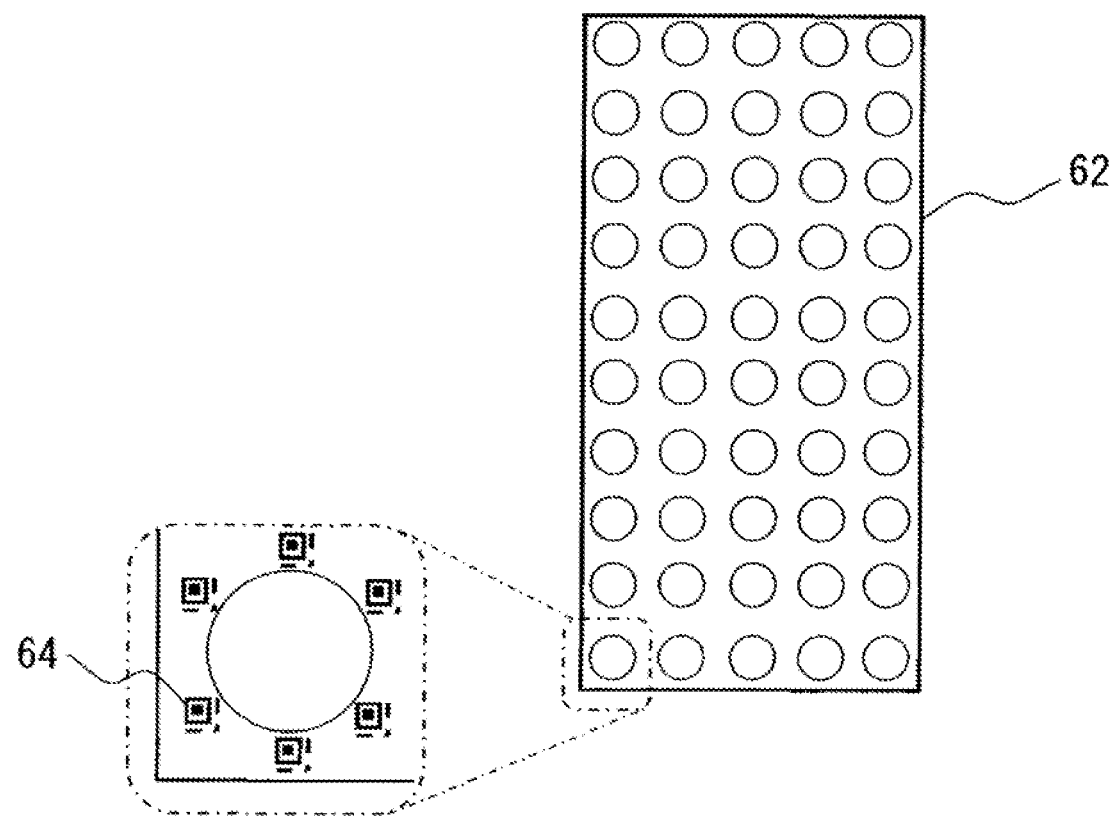

[Fig. 12]
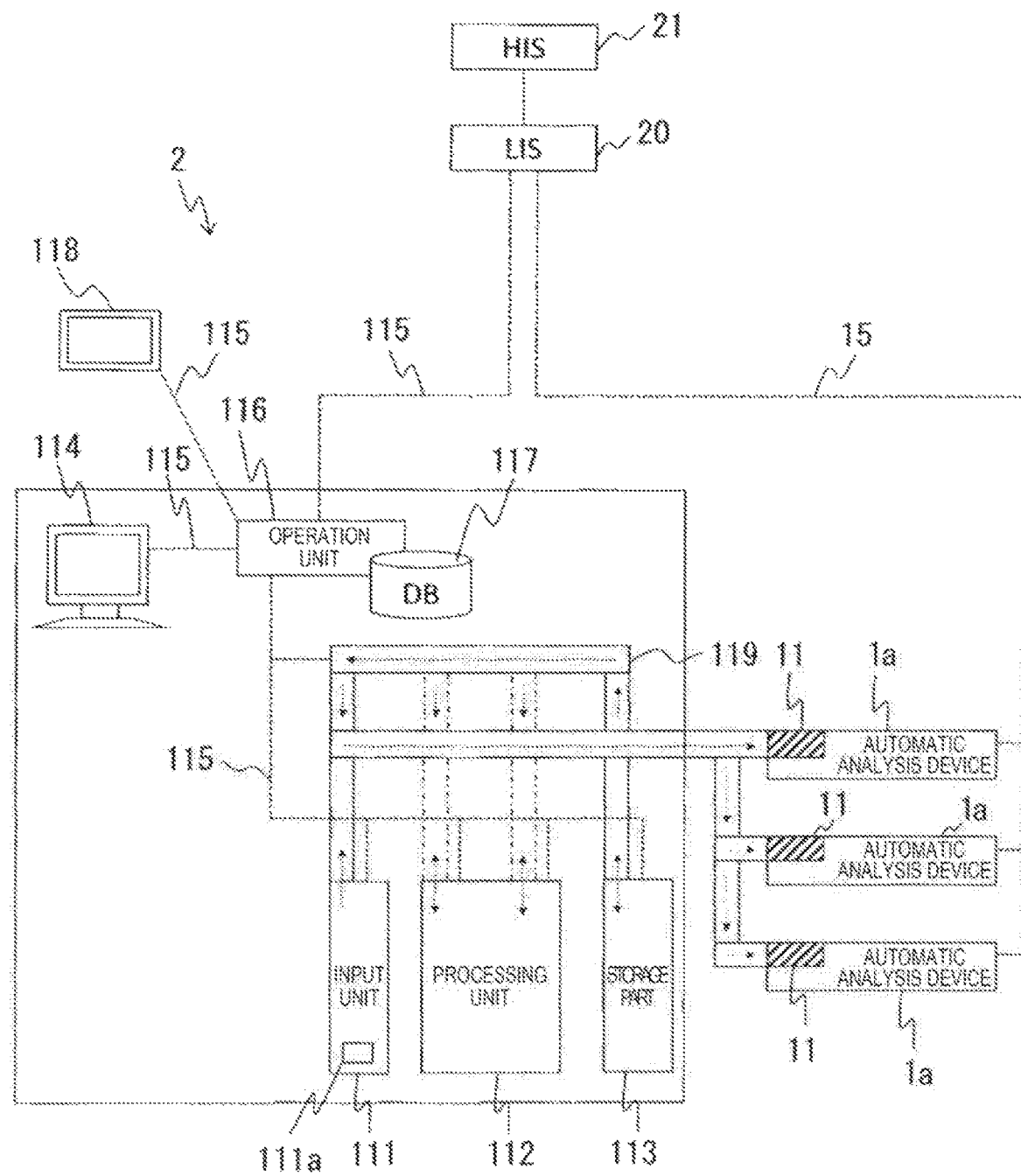

[Fig. 13]
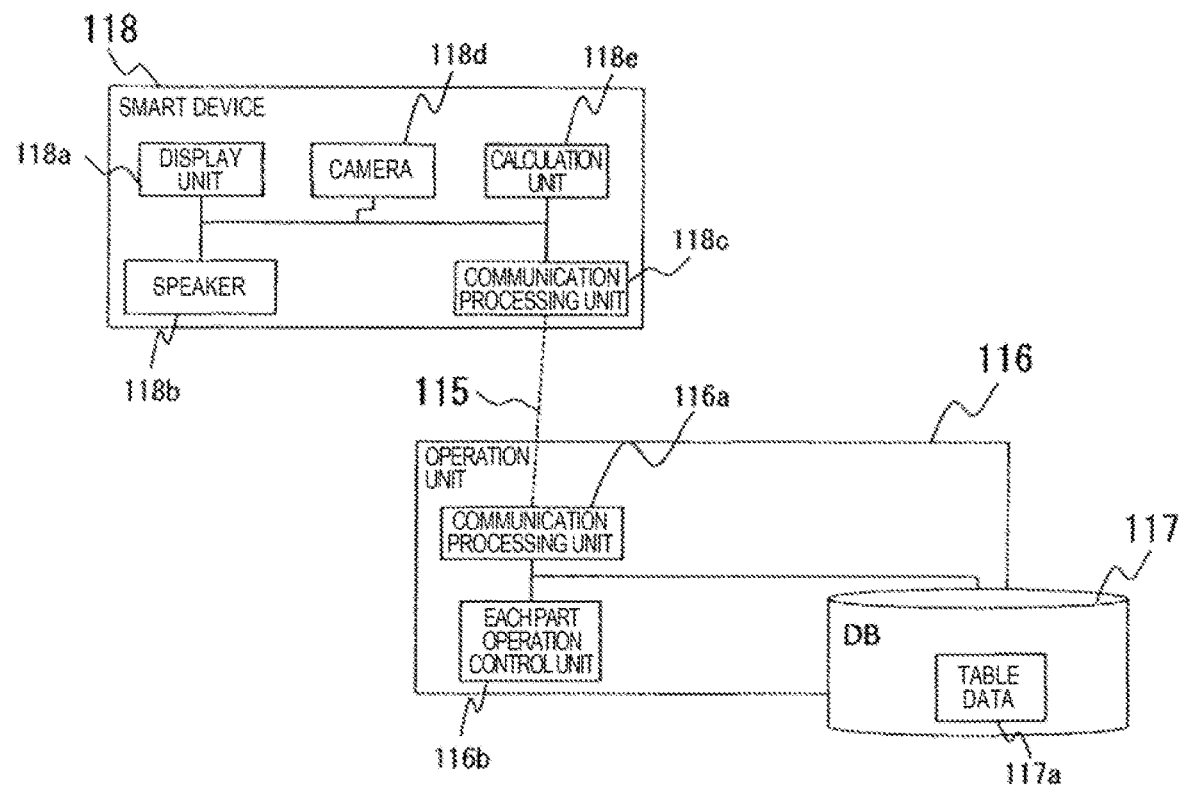

AUTOMATIC ANALYSIS DEVICE AND SPECIMEN INSPECTION AUTOMATION SYSTEM

TECHNICAL FIELD

The present invention relates to an automatic analysis device for analyzing a specimen, such as blood or urine, in a clinical test, and a specimen inspection automation system for processing a specimen.

BACKGROUND ART

For the purpose of promptly confirming an abnormality in a case where abnormal sampling is performed, PTL 1 discloses an automatic chemical analysis device including: sampling quality display means for detecting whether or not normal sampling has been performed and for displaying a result and sample identifying means for identifying a sample of pass or fail based on the detection result, in a sampler unit.

In addition, for the purpose of improving the efficiency of work related to an operation panel of a medical device, PTL 2 discloses a medical work support system including: a terminal device; a recognition unit; and a functional display unit, in which the terminal device includes a camera that captures the periphery and a display that displays an image captured by the camera, in which the recognition unit recognizes operation elements from an image of an operation panel displayed on the display when capturing the operation panel of medical equipment on which a plurality of operation elements are disposed, in which the functional display unit specifies the function assigned to the operation elements recognized by the recognition unit from function assignment information indicating the assignment of the function to each of the operation elements disposed on the operation panel, and in which the information indicating the specified function is displayed on the display in association with a region of the operation element included in the image of the operation panel.

CITATION LIST

Patent Literature

PTL 1: JP-A-1-219564
PTL 2: JP-A-2014-32620

SUMMARY OF INVENTION

Technical Problem

An automatic analysis device which performs qualitative and quantitative analysis with respect to a specimen which is a biological sample (infectious substance), such as blood or urine of patients, has been widely spread centering on many large hospitals and inspection centers due to the demand for rapidity and accuracy of analysis.

In addition, before analyzing a specimen with an automatic analysis device, various types of processing, such as centrifugation of specimens, dispensation of specimens to a dedicated container of each automatic analysis device, sticking of a barcode label or the like to a specimen container, and the like, are caused to be performed depending on the request details. A specimen inspection automation system for automatically performing such processing for labor-saving and efficiency improvement of specimen inspection has also been introduced.

In the related art, in a case where some inspection items become unanalyzable, the automatic analysis device itself generates an alarm and notifies an inspection technician who is operating. However, the operation state of the automatic analysis device continues as it is until the inspection technician stops the operation. Therefore, a plurality of specimens remaining uninspected only for unanalyzable inspection items occur to be randomly placed. In this case, in order to extract the specimen in which these uninspected items remain, it is necessary to perform extraction work while referring to a monitor of an operation unit. In addition, the breakdown of uninspected items cannot be confirmed without transition to another screen, and there is a problem that it takes an extremely long time.

PTL 1 discloses that the position at which the specimen which caused sampling abnormality exists is indicated by lighting an LED lamp provided in the device or by directly printing a mark on the specimen.

However, the LED lamp is attached to the device, and does not correspond to the position at which the specimen taken out from the device exists. In order to correspond to the specimen taken out from the device, the marks are printed directly on specimen containers, but with the marks, it is necessary to visually confirm the specimen containers without omission while manually arranging the orientation of all of the specimens. In addition, in order to reliably visually confirm that there is no mark, it is necessary to manually rotate the specimen more than one round. Therefore, there is still room for improvement.

In addition, as a location for printing the mark directly on the specimen, there may be a margin of a barcode label that sticks to the specimen, or the like, however, there is a risk that a barcode reading failure is caused as the printed mark is applied to the barcode. Furthermore, even when the mark is printed directly on a part to which the barcode label of the specimen container does not stick, there is also a problem that it is difficult to print as intended.

In addition, in PTL 2, the medical work support system that assigns the button function of the device and displays the guidance of the button function on the screen of the smart device is suggested. The medical work support system according to PTL 2 is a technology that belongs to a medical system area common to both of the automatic analysis device and the specimen inspection automation system.

However, the automatic analysis device and the specimen inspection automation system are a device and a system by which an inspection technician directly handles specimens, and manages an operation of containers into which the specimens are input. In the device and the system, the work is usually performed by wearing protective equipment, such as plastic gloves, for prevention of infection thereon, in order to avoid direct contact of skin or the like with the specimen in the specimen container.

When the technology of the medical work support system of PTL 2 is applied to the automatic analysis device or the specimen inspection automation system as it is, the screen of the smart device will also be touched with gloves that touched the specimen container. Therefore, there is a possibility that a contaminant adheres to the smart device even though an amount thereof is small, and a risk of contamination of the periphery of the device and the system increases. In addition, an operation in which the operator wears the gloves every time when operating the specimen container and takes off the gloves every time when operating the screen of the smart device is also considered, but the operation is extremely complicated and not realistic.

Without considering wearing and taking off the gloves, in order to perform an operation with respect to the specimen which is taken by the camera of the smart device, that is, the specimen which is at a far site from the smart device, and an operation on the screen which is at a near site from the smart device, an operation by the hands that alternately come and go becomes necessary, and the operation becomes complicated.

The invention has been made in consideration of the above-described problem, and an object thereof is to provide an automatic analysis device and a specimen inspection automation system which can reliably specify a specimen to be extracted from among a plurality of specimen containers installed on a holder, regardless of a place or whether being inside or outside of the device.

Solution to Problem

In order to solve the above-described problem, for example, the configuration described in claims is employed.

The present invention includes a plurality of means for solving the above-described problem, but as an example, there is provided an automatic analysis device including: a measurement processing unit which measures a concentration of a biological component contained in a specimen; an operation unit which controls the measurement processing unit; a data base which stores consideration information about the specimen; a smart device which includes a capturing unit for capturing a holder on which a specimen container that accommodates the specimen therein is installed; and a calculation unit which specifies a specimen container that accommodates a specimen having the consideration information taken in an image captured by the capturing unit of the smart device based on the consideration information stored in the data base, and displays marks in the specified specimen container, in which the calculation unit determines whether or not the displayed mark is a mark to be given and deletes the display of the mark in a case where it is determined that the mark is not a mark to be given as a result of the determination.

Advantageous Effects of Invention

According to the present invention, it is possible to easily, reliably and efficiently specify a specimen container to be extracted containing a specimen or the like that needs to be reprocessed, from a plurality of specimen containers which are installed on a holder and to which processing is finished.

BRIEF DESCRIPTION OF DRAWINGS

FIG. 1 is a top view of a rack on which a specimen container is installed.

FIG. 2 is a side view of the rack on which the specimen container is installed.

FIG. 3 is a block diagram illustrating an example of a configuration of an automatic analysis device according to a first embodiment of the present invention.

FIG. 4 is a block diagram illustrating an example of a configuration of a smart device, an operation unit, and a data base part of the automatic analysis device of the first embodiment.

FIG. 5 is a view illustrating an example of table data included in the automatic analysis device of the first embodiment.

FIG. 6 is a view illustrating a state where a mark is given to a specimen to be extracted because, for example, uninspected items remain, by taking an image of the rack on which the specimen container is installed by the smart device immediately from above, in the automatic analysis device of the first embodiment.

FIG. 7 is a view illustrating a state where guidance is given by taking an image of an operation of pinching the specimen to which the mark is given, by taking an image of the rack on which the specimen container is installed by the smart device immediately from above, in the automatic analysis device of the first embodiment.

FIG. 8 is a view illustrating a state where a notification to an upper system is instructed by taking an image of an operation of pointing the specimen to which the mark is given, by taking an image of the rack on which the specimen container is installed by the smart device immediately from above, in the automatic analysis device of the first embodiment.

FIG. 9 is a processing flowchart for giving a mark to a specimen in the automatic analysis device of the first embodiment.

FIG. 10 is a processing flowchart for giving guidance of a specimen and notifying the upper system in the automatic analysis device of the first embodiment.

FIG. 11 is a top view of a tray on which specimen containers are installed.

FIG. 12 is a block diagram illustrating an example of a configuration of a specimen inspection automation system according to a second embodiment of the present invention.

FIG. 13 is a block diagram illustrating an example of a configuration of a smart device, an operation unit, and a data base part in the specimen inspection automation system of the second embodiment.

DESCRIPTION OF EMBODIMENTS

Embodiments of an automatic analysis device and a specimen inspection automation system of the present invention will be described hereinafter with reference to the drawings.

First Embodiment

As a first embodiment of the present invention, the automatic analysis device will be described with reference to FIGS. 1 to 10.

First, an outline of a rack 31 will be described as an example of a holder used in an automatic analysis device 1 with reference to FIGS. 1 and 2. FIGS. 1 and 2 are views illustrating the details of the rack 31 mainly handled by the automatic analysis device 1, FIG. 1 is a top view of the rack 31, and FIG. 2 is a side view.

FIGS. 1 and 2 illustrate a state where one specimen container 61 is installed on the rack 31. As illustrated in FIGS. 1 and 2, the rack 31 is one type of a holder on which a plurality of specimen containers 61 for accommodating specimens which are biological samples (infectious substance), such as blood or urine of a patient or the like, therein are installed, and a rack ID label 33 and an identifier 34 are provided as markers on an upper surface of the rack 31.

Next, the outline of the automatic analysis device 1 will be described with reference to FIGS. 3 to 5. FIG. 3 is a block diagram illustrating the automatic analysis device 1. FIG. 4 is a block diagram illustrating the details of an operation unit 16, a data base 17, and a smart device 18. FIG. 5 is a view illustrating table data 17a stored in the data base 17.

The automatic analysis device 1 illustrated in FIG. 3 includes an input unit 11, a processing unit 12, a storage part 13, a monitor 14, communication means 15, the operation unit 16, the data base (DB) 17, the smart device 18, and a conveying line 19. This automatic analysis device 1 is connected to a laboratory information system (LIS) 20 or a hospital information system (HIS) 21 via the communication means 15.

The LIS 20 is an upper system of the automatic analysis device 1 or the specimen inspection automation system 2 (refer to FIG. 12) which will be described later, and controls the automatic analysis device 1 and the entire specimen inspection automation system 2 which will be described later. In addition, the HIS 20 is a system used on a clinical side, and is a system positioned at a higher level of the LIS 20.

The input unit 11 is a part for inputting the rack 31 on which the specimen container 61 that accommodates a specimen therein is installed into the automatic analysis device 1, and includes a specimen scanner 11a. The specimen scanner 11a is a device which reads a specimen barcode stuck to the specimen container 61 input from the input unit 11 or recognizes the rack ID label 33 or the identifier 34 provided in the rack 31 that accommodates the specimen container 61 therein, and is used for specifying which specimen container 61 is installed at a position of the identifier 34 on which rack ID 33.

The processing unit 12 is a part for measuring the concentration of a biological component contained in the specimen, and includes a reaction container 204, a reaction disk mechanism 205, a thermostatic chamber 207, a reagent storage unit 209, a specimen dispensing mechanism 210, a reagent dispensing mechanism 211, a stirring mechanism 212, a cleaning mechanism 213, a light source 214, a photometer 215, and an analog/digital (A/D) converter 216.

The reaction container 204 is a container in which reagents and the specimen are put and reacted to each other.

The reaction disk mechanism 205 is a member that holds a plurality of reaction containers 204. In addition, the reaction disk mechanism 205 conveys the reaction container 204 installed thereon to a designated position.

The thermostatic chamber 207 is a mechanism for keeping the reaction container 204 installed on the reaction disk mechanism 205 at a predetermined temperature, and keeps the reaction container 204 at a predetermined temperature.

The reagent storage unit 209 is a member which holds a plurality of reagent bottles 208 that are containers for accommodating reagents used for analysis therein. In addition, the reagent storage unit 209 conveys the reagent bottle 208 installed thereon to a designated position.

The specimen dispensing mechanism 210 is provided with a specimen dispensing probe, and is a device that divides the specimens by a certain small amount. The specimen dispensing mechanism 210 dispenses the specimens which are in the specimen container 61 into the reaction container 204 by a predetermined amount.

The reagent dispensing mechanism 211 is provided with a reagent dispensing probe, and is a device that divides the reagent by a certain small amount. The reagent dispensing mechanism 211 dispenses the reagent which is in the reagent bottle 208 into the reaction container 204 by a predetermined amount.

The stirring mechanism 212 is a device for stirring the reagent and a solution of the specimen which are in the reaction container 204 to make the distribution state of the components uniform.

The cleaning mechanism 213 is a device that suctions waste liquid and discharges cleaning liquid. The cleaning mechanism 213 suctions the reagent and the solution of the specimen which are in the reaction container 204. In addition, the cleaning mechanism 213 discharges the cleaning liquid into the reaction container 204 to clean the reaction container 204.

The light source 214 is a part that emits light used for absorbance measurement, and is configured with a halogen lamp, an LED, or the like.

The photometer 215 is a part that measures the absorbance of the solution in the reaction container 204 by receiving the light emitted from the light source 214 and passed through the reaction container 204, and is configured with a spectrometer or the like. The photometer 215 transmits the absorbance information to the A/D converter 216.

The A/D converter 216 is equipment which converts an analog signal into a digital signal, converts the input analog signal into a digital signal, and then, records the signal in the data base 17.

A storage part 13 is a part that stores the rack 31 therein.

The monitor 14 displays measurement item information or inspection results.

The communication means 15 is a member, such as a cable member or a wireless member, which mutually communicates with each mechanism in the automatic analysis device 1.

As illustrated in FIG. 4, the operation unit 16 includes a communication processing unit 16a, an each part operation control unit 16b, and an analysis calculation unit 16c.

The communication processing unit 16a controls communication with each mechanism in the automatic analysis device 1 via the communication means 15 and communication processing with the LIS 20, the HIS 21, and the like, links the information, exchanges the measurement item information or the inspection result, updates the contents of the information related to the specimen stored in the data base 17, and displays the contents of the information related to the specimen on the monitor 14. Each part operation control unit 16b controls the operation of each configuration element in the automatic analysis device 1 including the processing unit 12. The analysis calculation unit 16c calculates the concentration of the biological component contained in the specimen based on the digital signal converted by the A/D converter 216 and recorded in the data base 17.

The data base 17 stores the table data 17a related to the rack 31 input into the automatic analysis device 1. As illustrated in FIG. 5, the table data 17a includes consideration information, such as a specimen ID specified by the specimen scanner 11a, a rack ID of the rack on which the specimen container 61 that accommodates the specimen therein is installed, an identifier in the rack, a re-inspection flag for specifying whether or not re-inspection with respect to the specimen is necessary, an uninspection flag for specifying whether or not there is an uninspected item, an additional inspection flag for specifying the presence or absence of a request for additional inspection input via the HIS 21 or the like, inspection-required items for recording which one of the items is an item that requires re-inspection or the like, and the like.

Returning to FIG. 4, the smart device 18 includes a display unit 18a, a speaker 18b, a communication processing unit 18c, a camera (capturing unit) 18d, and a calculation unit 18e.

The display unit 18a is apart for outputting information to be supplied to an inspection technician, is configured with a display and the like, and displays an image captured by the camera 18d and information supplied from the calculation unit 18e.

The speaker 18b is a part that notifies the inspection technician of the details of the consideration information in the table data 17a supplied via the communication processing unit 18c by voice.

The communication processing unit 18c is a part that transmits and receives information to and from the communication processing unit 16a of the operation unit 16 by using radio waves, and for example, the communication processing unit 18c receives the information of the table data 17a stored in the data base 17 and supplies the information to the calculation unit 18e.

The camera 18d is a part that captures the rack 31 for each of the specimen containers 61 that are installed thereon.

The calculation unit 18e identifies the rack ID label 33, the identifier 34, and the specimen container 61 of the rack 31 from the image captured by the camera 18d by a marker type augmented reality technology. After this, based on the information of the specimen ID included in the table data 17a supplied via the communication processing unit 18c, the rack ID and the identifier, and each flag or inspection-required items, the specimen container 61 that accommodates the specimen having the consideration information therein is specified. After this, as illustrated in FIG. 6, a mark 32 is displayed so as to overlap the specified specimen container 61 on the image displayed on the display unit 18a.

FIG. 6 illustrates a state where the mark 32 is given to the display unit 18a of the smart device 18 in the specimen to be extracted due to the reason that the uninspected items remain, by taking an image of the specimen container 61 substantially directly from above the installed rack 31.

More specifically, first, the calculation unit 18e recognizes the rack ID label 33 including the barcode stuck to the rack 31 in the image captured by the camera 18d, and acquires the rack ID. An obtaining method thereof may be either a barcode or a number that can be visually seen by a person, and may be obtaining of both of the barcode and the number to confirm whether or not the rack ID matches. In addition, in the use of the rack 31, there are uses for a general specimen, for an emergency specimen, for re-inspection, for control measurement, for cleaning, and the like, and in products in which these uses are color-coded, it is desirable to perform rationality check by obtaining both of the rack ID and the rack 31, and to prevent an error from occurring in the given mark 32.

Next, via the communication processing unit 18c and the communication means 15, the information about the specimen installed on the rack 31 recorded in the table data 17a of the data base 17 of the operation unit 16 is received, and from the obtained rack ID and color, the specimen is specified. At this time, as a marker for recognizing the position at which the specimen container 61 is installed, on the upper surface of the rack 31, in addition to the rack ID label 33, the identifier 34 is provided. Since the orientation of the rack 31 can be recognized based on the orientation of the rack ID label 33 itself and the positional relationship between the rack ID label 33 and the identifier 34, from the number of identifiers 34 positioned at equal intervals, it is possible to recognize the position of the installed specimen container 61 without error.

After this, a mark 32 is given to the recognized position of the specimen container 61.

In addition, when the calculation unit 18e recognizes that the finger of the inspection technician has performed the operation (first predetermined operation) of pinching the specimen container 61 in the image captured by the camera 18d by the AR technology, as illustrated in FIG. 7, in addition to the mark 32, the type of the flag, the name of inspection-required items, and the like are displayed as a guidance 42 as illustrated in FIG. 7.

FIG. 7 illustrates a state where a factor to be extracted of the specimen to which the mark 32 is given is given as the guidance 42 by performing an operation of pinching the specimen to which the mark 32 is given as the specimen to be extracted by a finger 41, by taking an image of the rack 31 on which the specimen container 61 is installed immediately from above.

More specifically, first, the calculation unit 18e recognizes the shape and the number of fingers 41 of the inspection technician which is taken in the image captured by the camera 18d. As a technology for recognizing the shape and position of the finger 41, it is considered, for example, to apply a markerless method augmented reality technology that can high-speed recognition of the object itself to follow the movement of the camera at high speed. Next, when recognizing that the two fingers 41 are picking the specimen, based on the specimen information of each position received from the operation unit 16, the guidance 42 which is the breakdown of the items remaining unexamined or the data alarm of the items are given.

In addition, for example, in a case where the specimen amount is not sufficient and some inspection cannot be performed, specimen needs to be added and collected, but in case of a hospital outpatient, blood or the like is taken immediately after the arrival at the hospital, it is necessary to arrange a set of inspection results before medical examination, and thus, it is necessary to rapidly notify the clinical side of the message. In general, it is common to operate a mechanism which is provided in the automatic analysis device 1 to automatically determine the presence or absence of re-inspection. Meanwhile, regardless of the logic of the system or the like, there is also a case of determining the presence or absence of re-inspection by the experience of the inspection technician. As an example of the case, for example, there are ones such as "data transition which is not a problem for dialysis patients" and "data transition which is necessary for re-inspection for other general outpatients".

In such a case, the calculation unit 18e can give the mark 32 which suspends the determination about whether or not the re-inspection is necessary. In addition, the suspension is a function on the system. In addition, when the inspection technician performs an operation of pinching the suspended mark displayed on the display unit 18a, the calculation unit 18e can display information, such as "Patient Inspection Request Source" and "Suspension Items (Inspection Item+ Data)", on the display unit 18 a as the guidance 42, or can execute the processing of "re-inspection notification to the HIS 21 via the LIS 20".

In addition, although the rack ID label 33 or the identifier 34 may be hidden by the finger 41 or the like, the mark 32 and the guidance 42 are continuously given following the specimen container 61 displayed on the display unit 18a. In addition, when the finger 41 is released, the calculation unit 18e recognizes this and returns to the display screen of the original mark 32, that is, the state illustrated in FIG. 6.

In addition, when the calculation unit 18e recognizes that the inspection technician performs the operation (second predetermined operation) for indicating the specimen container 61 by one finger illustrated in FIG. 8 in the image captured by the camera 18d by the AR technology, the consideration information in the table data 17a is notified to the LIS 20 or the HIS 21.

FIG. 8 illustrates an aspect in which the specimen to which the mark 32 is given as the specimen to be extracted is pointed by one single finger 41 by taking the rack 31 on which the specimen container 61 is installed substantially directly from above. FIG. 8 illustrates that the inspection technician issues an instruction to notify the LIS 20 and the HIS 21 positioned thereabove that the uninspected state is achieved due to insufficient specimen amount.

More specifically, first, the calculation unit 18e recognizes the shape and the number of the finger of the inspection technician which is taken in the image captured by the camera 18d. Next, when recognizing a state where one finger points to the specimen container 61, a case where the specimen amount is not sufficient is notified to the LIS 20 via the communication means 15. Furthermore, notification from the LIS 20 to the HIS 21 is also possible.

In addition, the contents of the information to be notified to the HIS 21 via the LIS 20 are not limited only to the re-inspection determination. For example, when the determination is not possible on the laboratory side regarding the suspended specimen as described above, an operation for notifying the determination about clinical (doctor) when pointing the specimen container 61 to the HIS 21 by one finger as illustrated in FIG. 8, is also considered.

When the finger 41 is released, the calculation unit 18e recognizes this and returns to the display screen of the original mark 32, that is, the state shown in FIG. 6.

In addition, when it is recognized that the inspection technician extracted the specific specimen container 61 from the rack 31 in the image captured by the camera 18d by the AR technology, the calculation unit 18e notifies the data base 17 of information about extraction of the specimen container 61 from the rack 31 or the information about the specimen accommodated in the specimen container 61, and stores the notification in the data base 17. In this case, the information can also be reflected on the display of the monitor 14.

In this case, the calculation unit 18e gives a mark indicating "extracted" to the position from which specimen is extracted, and when performing the operation of pinching with the finger 41 as illustrated in FIG. 7, the original specimen and the current location can also be confirmed by the guidance 42.

In addition, when the calculation unit 18e recognizes that the extracted specimen container 61 is installed on another rack 31, the calculation unit 18e newly generates the measurement item information that corresponds to the type of another rack 31 which is the installation destination, and stores the information in the data base 17.

In addition, there are many operations that determines and processes whether or not the re-inspection is necessary, using the function of the LIS 20 side In order to correspond to this, the calculation unit 18e gives a specific mark 32 to the specimen to be actually re-inspected by communication linking with the LIS 20. In addition, the function may be handled as an option.

In addition, regarding the information in which each position of the rack 31 and the specimen of the rack 31 are linked to each other, it is possible to share the information with the LIS 20.

In this manner, in the calculation unit 18e of the smart device 18, by combining the augmented reality technologies of the marker method illustrated in FIG. 9 and the markerless method as illustrated in FIG. 7 or 8 with each other, the mark 32 or the guidance 42 is given to the screen of the smart device 18, and the instruction for the LIS 20 communication is realized.

Returning to FIG. 3, the conveying line 19 is a line for conveying the rack 31 on which the specimen container 61 is mounted from the input unit 11 to the processing unit 12 or the storage part 13, and for conveying the rack 31 so as to return the rack 31 from the storage part 13 to the input unit 11 and the processing unit 12.

Next, a method of analyzing the specimen by the automatic analysis device 1 of the present embodiment will be described hereinafter. Basically, analysis is performed by controlling each element by each part operation control unit 16b of the operation unit 16.

First, each part operation control unit 16b of the operation unit 16 controls the conveying line 19 so as to convey the rack 31 installed on the conveying line 19 to the position directly below a movement track of the specimen dispensing probe of the specimen dispensing mechanism 210 in the processing unit 12.

Next, each part operation control unit 16b of the operation unit 16 controls the specimen dispensing mechanism 210 to suction the specimen input into the specimen container 61 installed on the rack 31 by a predetermined amount and discharges the specimen in the installed reaction container 204 installed on the reaction disk mechanism 205.

Next, each part operation control unit 16b of the operation unit 16 controls the reaction disk mechanism 205 to convey the reaction container 204 into which the specimen has been input to the position directly below the movement track of the reagent dispensing mechanism 211. In addition, a the same time, each part operation control unit 16b of the operation unit 16 controls the reagent storage unit 209 to convey the predetermined reagent bottle 208 to the position directly below the moving track of the reagent dispensing mechanism 211.

Next, each part operation control unit 16b of the operation unit 16 controls the reagent dispensing mechanism 211 to suction a predetermined amount of the reagent input into the reagent bottle 208 and to discharge the reagent in the reaction container 204 into which the specimen that is previously discharged is input.

Next, each part operation control unit 16b of the operation unit 16 controls the reaction disk mechanism 205 to convey the reaction container 204 into which the reagent and the solution of the specimen are input, to the position of the stirring mechanism 212.

Next, each part operation control unit 16b of the operation unit 16 controls the stirring mechanism 212 to agitate the reagent and the solution of the specimen input into the reaction container 204.

Next, each part operation control unit 16b of the operation unit 16 controls the reaction disk mechanism 205 to convey the reaction container 204 into which the reagent and the solution of the specimen are input, to the position of the photometer 215.

Next, each part operation control unit 16b of the operation unit 16 controls the light source 214 to generate light. In addition, at the same time, each part operation control unit 16b of the operation unit 16 controls the photometer 215 to transmit the measured absorbance information to the A/D converter 216. Furthermore, at the same time, each part operation control unit 16b of the operation unit 16 controls the A/D converter 216 to record the information about the absorbance converted into the digital signal in the data base 17.

After this, the analysis calculation unit 16c of the operation unit 16 calculates the concentration and the like of the predetermined component in the specimen based on the absorbance information.

At the same time, each part operation control unit 16b of the operation unit 16 controls the reaction disk mechanism 205 to convey the reaction container 204 into which the reagent and the solution of the specimen are input, to the position of the cleaning mechanism 213.

Next, each part operation control unit 16b of the operation unit 16 controls the cleaning mechanism 213 to clean the reaction container 204 into which the reagent and the solution of the specimen, and to prepare for the next analysis.

Next, the flow of processing for giving the mark 32 of the calculation unit 18e of the smart device 18 will be described with reference to FIG. 9. FIG. 9 is a view illustrating a flowchart for realizing the processing in the calculation unit 18e.

First, the calculation unit 18e of the smart device 18 starts processing (step S70).

Next, the calculation unit 18e recognizes the rack ID and the rack color of the rack 31 taken in the image captured by the camera 18d by the AR technique (step S71).

Next, the calculation unit 18e recognizes the identifier 34 in the rack 31 and recognizes the position (step S72).

Next, the calculation unit 18e determines whether or not the specimen container 61 is installed on the position by the AR technology (step S73). When it is determined that the specimen container 61 is installed, the processing moves to step S74, and when it is determined that the specimen container 61 is not installed, the processing moves to step S77.

When it is determined that the specimen container 61 is installed in step S73, then, the calculation unit 18e inquires the data base 17 and receives the table data 17a (step S74).

Next, the calculation unit 18e refers to the received table data 17a, the consideration information is recorded regarding the specimen of the specimen container 61 installed on the position, and it is determined whether or not there is a mark 32 to be given (Step S75). When it is determined that there is the mark 32 to be given, the processing moves to step S76, and when it is determined that there is no mark 32 to be given, the processing moves to step S77.

Next, the calculation unit 18e gives the mark 32 to the position of the specimen container 61 on the display unit 18a (step S76).

Meanwhile, when it is determined that there is no mark 32 to be given or when it is determined that the specimen container 61 is not installed, the calculation unit 18e deletes the mark displayed at the position (step S77).

Next, the calculation unit 18e determines whether or not there is an unrecognized position in the rack 31 in the image (step S78). When it is determined that there is an unrecognized position, the processing returns to step S72, and when it is determined that there is no unrecognized position, the processing moves to step S79.

Next, the calculation unit 18e determines whether or not there is the unrecognized rack 31 in the image (step S79). When it is determined that there is the unrecognized rack 31, the processing returns to step S71, and when it is determined that there is no unrecognized rack 31, the processing moves to step S80.

Next, the calculation unit 18e waits for a certain period of time (step S80).

Next, the calculation unit 18e determines whether or not the stop of the program is instructed (step S81). When it is determined that the stop is not instructed, the processing moves to step S82.

Next, the calculation unit 18e handles each rack as unrecognized without erasing the given mark (step S82), and the processing returns to step S71.

Meanwhile, when it is determined that the stop is instructed, the processing is finished.

The calculation unit 18e repeatedly executes the processing illustrated in FIG. 9 until the operation of the smart device 18 is stopped, and accordingly, the movement of the camera 18d is followed at high speed.

Next, processing for recognizing the shape of the finger 41, giving the guidance 42, and realizing the processing of commanding the communication of the LIS 20, will be described with reference to FIG. 10. FIG. 10 is a view illustrating a flowchart for realizing the processing in the calculation unit 18e, and this processing is repeatedly executed until the operation of the smart device 18 is stopped.

First, the calculation unit 18e of the smart device 18 starts the processing (step S90).

Next, the calculation unit 18e recognizes whether or not the finger 41 of the inspection technician exists in the vicinity where the mark 32 is displayed (step S91).

Next, the calculation unit 18e determines whether or not the finger 41 of the inspection technician exists on the screen as a result of step S91 (step S92). When it is determined that the finger 41 exists, the processing moves to step S93, and when it is determined that the finger 41 does not exist, the processing moves to step S94.

Next, the calculation unit 18e recognizes the shape of the finger 41, for example, by the markerless type augmented reality technology (step S93).

Next, the calculation unit 18e determines whether the shape of the finger is a "knob" operation for pinching the specimen container 61, a "one-finger" operation for indicating a specific specimen container 61 with one finger, or "other" operations other than the above operations. (step S95). When it is determined that the operation is the "knob" operation, the processing moves to step S96, when it is determined that the operation is the "one-finger" operation, the processing moves to step S99, and when it is determined that the operation is the "other" operation, the processing is finished.

Next, the calculation unit 18e inquires the data base 17 about whether or not the consideration information exists for the specimen accommodated in the specimen container 61 installed at the rack position, and receives the result (step S96).

Next, the calculation unit 18e determines whether or not there is the guidance 42 to be displayed, based on the information received in step S96 (step S97). When it is determined that the guidance 42 to be displayed exists, the processing moves to step S98, and when it is determined that the guidance 42 does not exist, the processing is finished.

Next, the calculation unit 18e gives the guidance 42 of the rack position (step S98), and finishes the process.

Meanwhile, when it is determined that the operation is "one-finger" operation in step S95, the calculation unit 18e transmits the re-inspection instruction of the rack position to the operation unit 16 and transmits the instruction to the LIS 20 or the HIS 21 (step S99), and finishes the processing.

In addition, when it is determined that the finger of the inspection technician exists in step S92, the calculation unit 18e deletes the guidance of the rack position (step S94), and finishes the process.

In addition, in a waiting step (step S79) of processing for giving the mark 32 illustrated in FIG. 9, it is assumed that the processing illustrated in FIG. 10 is incorporated as a part of the processing. However, depending on the shape of the finger 41, since the communication with the operation unit 16 occurs, in consideration of suppressing the increase in system load, it is considered that the processing is performed being incorporated immediately before the inquiry processing to the data base 17 (step S74 in FIG. 9) to the data base 17 which is the mark giving processing.

According to the above-described embodiment, the following effects can be obtained.

In the first embodiment of the above-described automatic analysis device, in order to easily identify the specimen to be extracted because, for example, uninspected items remain, from the rack 31 collected to the storage part 13 or the rack 31 taken out from the storage part 13, the rack 31 is taken by the camera 18d of the smart device 18, and in the calculation unit 18e of the smart device 18, based on the combination information of the rack ID 33 and the identifier 34 and the specimen information of each position received from the operation unit 16, the mark 32 is given to the position of the specimen to be extracted because, for example, uninspected items remain, by the AR technology.

Accordingly, by confirming the display unit 18a of the smart device 18, it is possible to easily, reliably, and efficiently specify the specimen container 61 to be extracted, and it is possible to substantially improve the work efficiency when extracting only the specimen which is necessary for the reprocessing, such as a case where the uninspected items remain and the re-inspection is necessary, from the specimen group to which the processing is finished, compared to the related art. In addition, since only the display unit 18a of the smart device 18 may be confirmed, it is possible to specify the specimen without a problem even after being taken out from the device, it is not necessary to go back and forth between screens, and it is possible to improve the work efficiency.

In addition, when the calculation unit 18e recognizes that the finger of the operator has performed the operation of pinching the specimen container 61 in the image captured by the camera 18d, in addition to the mark 32, by displaying the type of the flag or the name of the inspection-required items as the guidance 42, the inspection technician can determine a necessary procedure by a simple operation after the extraction, it is possible to smoothly move to the work to be started after this, and it is possible to further improve the work efficiency.

Furthermore, when it is recognized that the inspection technician has performed the operation of pointing the specimen container 61 using one finger as illustrated in FIG. 8 in the image captured by the camera 18d, by notifying the consideration information in the table data 17a to the LIS 20 or the HIS 21, the inspection technician notifies the clinical side of the situation, such as insufficiency of specimen amount, and thus, the notification is possible by one operation without moving to other operations, such as making a phone call, and it is possible to further improve the work efficiency.

In addition, by notifying and storing the information about extraction of the specimen container 61 from the rack 31 and information about the extracted specimen, with respect to the data base 17, it is possible to keep the information of the data base 17 in the latest state, and a more accurate system can be operated.

Furthermore, by newly generating the measurement item information that corresponds to the type of the rack 31 of the installation destination, depending on the type of the rack 31 of the setting destination on the operation unit 16 side, it is possible to automatically create the measurement item information for the first inspection only with respect to the uninspected item in the rack 31 for general and emergency specimen, or the measurement item information about the abnormal data item including the uninspected item in the rack 31 for re-inspection, it is possible to move to re-measurement without inputting the necessary information again by the inspection technician, and to further improve work efficiency.

In addition, since the specimen scanner 11a is provided and each piece of information in the rack 31 is specified by the specimen scanner 11a, each piece of information can be specified when the specimen scanner 11a is input into the automatic analysis device 1, and thus, the inspection technician can input the rack 31 into the automatic analysis device 1, and it is possible to improve the work efficiency.

Furthermore, by providing the speaker 18b for notifying the details of the consideration information in the table data 17a to the inspection technician by voice, it is possible to transmit more accurate information to the inspection technician, and since it is possible to more accurately specify the specimen container 61 to be extracted, it is possible to further improve the work efficiency.

In addition, although FIG. 6 illustrates a state where a part of the two racks 31 are taken, there is no upper limit to the number of the racks 31 to be searched.

In addition, the place where the rack 31 is placed as illustrated in FIG. 6 and the like is not required to be in the device that handles the rack 31, and may be within a range in which the rack 31 can be captured by the smart device 18 and the communication with the operation unit 16 is performed.

Second Embodiment

As a second embodiment of the present invention, a specimen inspection automation system will be described with reference to FIGS. 11 to 13. The same reference numerals are given to the same configuration components as those of the automatic analysis device 1 of the first embodiment, and a detailed description thereof will be omitted.

First, a tray 62 which is mainly handled in the specimen inspection automation system 2 and on which fifty specimen containers 61 can be installed, will be described with reference to FIG. 11.

Unlike the rack 31 illustrated in FIG. 1, the tray 62 illustrated in FIG. 11 includes a two-dimensional barcode 64 as a marker around each position. According to this, it is possible to give the mark 32 to specimen installed at each position. This is because, even when trays ID are disposed at several places on the upper surface of the tray 62, the tray ID is not always within the range captured by the camera 18d of the smart device 18. The two-dimensional barcodes 64 disposed around each position includes at least information about the tray ID of the tray and the position as information.

Next, an outline of the specimen inspection automation system 2 will be described with reference to FIG. 12. FIG. 12 is a block diagram illustrating the specimen inspection automation system 2.

The specimen inspection automation system 2 illustrated in FIG. 12 includes an input unit 111, a processing unit 112, a storage part 113, a monitor 114, communication means 115, an operation unit 116, a data base (DB) 117, a smart device 118, and a conveying line 119. The specimen inspection automation system 2 is connected to the LIS 20 or the HIS 21 via the communication means 115, and is further connected to the automatic analysis devices 1a via the communication means 15. The automatic analysis devices 1a have configurations similar to that shown in FIG. 3.

The input unit 111 is a part for inputting the tray 62 on which the specimen container 61 or the rack 31 that accommodates the specimen therein is installed into the specimen inspection automation system 2, and includes a specimen scanner 111a. The specimen scanner 111a has substantially the same configuration as that of the specimen scanner 11a illustrated in the first embodiment.

The processing unit 112 is a part for performing predetermined processing with respect to the specimen, and for example, performs processing, such as centrifugal separation processing, check of specimen amount, further division of the specimen containers, and the like.

A storage part 113 is a part that stores the tray 62 therein.

The monitor 114 displays the results of processing by the processing unit 112, the measurement item information, and inspection results.

The communication means 115 is a member, such as a cable member or a wireless member, which mutually communicates with each mechanism in the specimen inspection automation system 2.

As illustrated in FIG. 13, the operation unit 116 includes a communication processing unit 116a and an each part operation control unit 116b.

The communication processing unit 116a controls communication with each mechanism in the specimen inspection automation system 2 via the communication means 115 and communication processing with an LIS 120, an HIS 121, and the like, links the information, exchanges the measurement item information or the inspection result, updates the contents of the information related to the specimen stored in the database 117, and displays the contents of the information related to the specimen on the monitor 114. Each part operation control unit 116b controls each configuration element in the specimen inspection automation system 2 including the processing unit 112.

The data base 117 stores the table data 117a related to the tray 62 input into the specimen inspection automation system 2. The table data 117a has substantially the same configuration as that of the table data 17a illustrated in FIG. 5.

Returning to FIG. 12, the smart device 118 includes a display unit 118a, a speaker 118b, a communication processing unit 118c, a camera (capturing unit) 118d, and a calculation unit 118e.

The display unit 118a, the speaker 118b, the communication processing unit 118c, the camera 118d, and the calculation unit 118e which are loaded on the smart device 118 respectively have substantially the same configurations as those of the display unit 18a, the speaker 18b, the communication processing unit 18c, the camera 18d, and the calculation unit 18e which are loaded on the smart device 18 of the first embodiment.

More specifically, regarding the calculation unit 118e, the two-dimensional barcode 64 of the tray 62 is identified from the image captured by the camera 118d by a marker type augmented reality technology, and a specimen ID included in the table data 117a, the two-dimensional barcode 64, the specimen container 61 that accommodates the specimen having the consideration information therein based on information of each flag or inspection-required items, are specified. After this, as illustrated in FIG. 6, a mark 32 is displayed so as to overlap the specified specimen container 61 on the image displayed on the display unit 118a.

In addition, when the calculation unit 118e recognizes that the finger of the inspection technician has performed the operation (first predetermined operation) of pinching the specimen container 61 in the image captured by the camera 118d by the AR technology, as illustrated in FIG. 7, in addition to the mark 32, the type of the flag, the name of inspection-required items, and the like are displayed as a guidance 42 as illustrated in FIG. 7.

In addition, when the calculation unit 118e recognizes that the inspection technician performs the operation (second predetermined operation) for indicating the specimen container 61 by one finger illustrated in FIG. 8 in the image captured by the camera 118d by the AR technology, the consideration information in the table data 117a is notified to the LIS 20 or the HIS 21.

In addition, when it is recognized that the inspection technician extracted the specific specimen container 61 from the tray 62 in the image captured by the camera 118d by the AR technology, the calculation unit 118e notifies the data base 117 of information about extraction of the specimen container 61 from the tray 62 or the information about the specimen accommodated in the specimen container 61, and stores the notification in the data base 117. In this case, the information can also be reflected on the display of the monitor 114.

The conveying line 119 is a line for conveying the tray 62 or the like on which the specimen container 61 is mounted from the input unit 111 to the processing unit 112 or the storage part 113, and for conveying the tray 62 or the like so as to return the tray 62 or the like from the storage part 113 to the input unit 111 and the processing unit 112. In addition, the conveying line 119 is a line for conveying the tray 62 or the like on which the specimen container 61 that accommodates the specimen processed by the processing unit 112 therein is installed, to each automatic analysis device 1.

The automatic analysis device 1 has substantially the same configuration as that of the automatic analysis device 1 of the first embodiment.

A flow of the processing for giving the mark 32 of the calculation unit 118e of the smart device 118 in the specimen inspection automation system 2 is substantially the same as the flowchart illustrated in FIG. 9, and a flow of the processing of recognizing the shape of the finger 41 and giving the guidance 42 is substantially the same as the flowchart illustrated in FIG. 10.

Even in the specimen inspection automation system in the embodiment, substantially the same effects as those of the automatic analysis device of the first embodiment, that is, improvement of work efficiency, such as an effect that it is possible to grasp factors to be extracted as the specimen container 61 is directly touched with the finger 41 that wears plastic gloves, and to notify the HIS 21 of the result as necessary by searching for the specimen to be extracted through the smart device 118, is achieved.

In addition, in the present embodiment, as an example, an aspect in which three automatic analysis devices 1 to which the input unit 11 is connected, are connected before the conveying line 119 of one specimen inspection automation system 2, is illustrated. However, the number of configuration units of automatic analysis device 1 and the specimen inspection automation system 2 can be freely combined according to the operating condition of the laboratory. The automatic analysis device 1 and the specimen inspection automation system 2 may not be connected to each other and may independently operate at separate places, and the automatic analysis device 1 and the specimen inspection automation system 2 may be integrated with each other.

In addition, in specimen inspection automation system 2, depending on the type of pre-processing performed with respect to the specimen (centrifugal separation and the like) or the type of holder, there is a case where the ID or the position of the holder installed when being input into the specimen inspection automation system 2, and the ID or the position of the holder installed when being extracted from the specimen inspection automation system 2, are different from each other. In this case, in addition to the input of the specimen container 61, it is desirable to perform the processing of specifying the position with the ID or the position again after the processing of changing the ID or the position of the holder, and to store the result in the data base 17. The rechecking is desirably carried out in a case where the ID or the position of the holder changes in the automatic analysis device 1 as described in the first embodiment.

Others

In addition, the present invention is not limited to the above embodiments, and includes various modification examples. The above-described embodiments are embodiments which are described in detail in order to make it easy to understand the present invention, and are not limited to a case where all of the described configurations are necessarily provided. In addition, a part of the configuration of a certain embodiment can be replaced with the configuration of the other embodiment, and the configuration of the other embodiment can be added to the configuration of a certain embodiment. In addition, it is also possible to add, remove, or replace other configuration components with a part of the configuration of each embodiment.

For example, in the future, in a case where wearable devices, such as eyeglasses are more versatile, when mounting wearable devices as the smart devices 18 and 118 of the automatic analysis device 1 and the specimen inspection automation system 2 of the present invention, both hands are free, and thus, it can be expected that even more effects can be obtained.

In addition, in the above-described embodiment, the operation of pinching and the operation of pointing with the finger 41 are described, however, other operations using the finger 41 and a so-called switch function by an object (not illustrated) that is recognizable by the program are within the range of the embodiments of the present invention, and do not limit the present invention.

In addition, in the above-described embodiment, an automatic analysis device which performs biochemical analysis of blood or the like as an automatic analysis device is described as an example, but an automatic analysis device is not limited to a biochemical analyzer, and can also be employed to an immunoanalyser which performs immunological analysis.

REFERENCE SIGNS LIST

1 . . . AUTOMATIC ANALYSIS DEVICE
2 . . . SPECIMEN INSPECTION AUTOMATION SYSTEM
11, 111 . . . INPUT UNIT
11a, 111a . . . SPECIMEN SCANNER
12, 112 . . . PROCESSING UNIT
13, 113 . . . STORAGE PART
14, 114 . . . MONITOR
15, 115 . . . COMMUNICATION MEANS
16, 116 . . . OPERATION UNIT
16a, 116a . . . COMMUNICATION PROCESSING UNIT
16b, 116b . . . EACH PART OPERATION CONTROL UNIT
16c . . . ANALYSIS CALCULATION UNIT
17, 117 . . . DATA BASE
17a, 117a . . . TABLE DATA
18, 118 . . . SMART DEVICE
18a, 118a . . . DISPLAY UNIT
18b, 118b . . . SPEAKER
18c, 118c . . . COMMUNICATION PROCESSING UNIT
18d, 118d . . . CAMERA
18e, 118e . . . CALCULATION UNIT
19, 119 . . . CONVEYING LINE
20 . . . LIS (LABORATORY INFORMATION SYSTEM)
21 . . . HIS (HOSPITAL INFORMATION SYSTEM)
31 . . . RACK
32 . . . MARK
33 . . . RACK ID LABEL
34 . . . IDENTIFIER
41 . . . FINGER
42 . . . GUIDANCE
61 . . . SPECIMEN CONTAINER
62 . . . TRAY
64 . . . TWO-DIMENSIONAL BARCODE

The invention claimed is:

1. An automatic analysis device comprising:
a measurement processing unit which includes a detector configured to measure a concentration of a biological component contained in a specimen;
a first processor programmed to control the measurement processing unit;
a database which stores consideration information about the specimen, the consideration information including one or more of information about a necessity of re-inspection of the specimen, information about an existence of an uninspected item of the specimen, or information about an existence of a request for additional inspection of the specimen;
one or more holders configured to hold a specimen container accommodating the specimen, wherein each of the one or more holders has a label;
a smart device which includes a display screen, a camera and a second processor,
wherein the second processor is programmed to:
control the camera to capture a first image including a first holder on which the specimen container that accommodates the specimen therein is installed,
display the image on the display screen,
recognize the label on the first holder in the first image,
communicate information about the specimen container that accommodates the specimen in the first holder in the first image,
determine whether a mark is to be given to the specimen container in the first image based on the consideration information stored in the database,
in response to determining that the mark is to be given, add the mark to overlap the specimen container in the first image and update the display thereof on the display screen,
recognize one or more fingers in the first image,
determine whether the one or more fingers in the first image is performing a first predetermined operation or a second predetermined operation to the specimen container having the added mark in the first image,
in response to determining that the one or more fingers is performing the first predetermined operation, display details of the consideration information in proximity to the added mark in the first image on the display screen, and
in response to determining that the one or more fingers is performing the second predetermined operation, send the consideration information to a laboratory information system or a hospital information system.

2. The automatic analysis device according to claim 1, wherein the second processor is further programmed to:

control the camera to capture a second image of the first holder, recognize the label on the first holder in the second image, determine that the specimen container is extracted from the first holder by an inspection technician in the second image, and communicate information about the specimen container extracted from the first holder in the second image with the consideration information in the database.

3. The automatic analysis device according to claim 2, wherein the second processor is further programmed to:

control the camera to capture a third image of a second holder containing the specimen container, recognize the label of the second holder in the third image determine the specimen container in the second holder of the third image has been extracted from the first holder in the second image by the inspection technician and is installed on the second holder in the third image, communicate information about the specimen container in the second holder in the third with the consideration information in the database to store measurement item information corresponding to the second holder.

4. The automatic analysis device according to claim 1, further comprising;

a scanner configured to read the label provided on the one or more holders which are input into the automatic analysis device, the specimen container being installed on one of the one or more holders, wherein the scanner is further programmed to:

recognize an installation position of the specimen container that accommodates the specimen in the image using information in the label read by the scanner.

5. The automatic analysis device according to claim 1, wherein the smart device further includes a speaker, and wherein the second processor is further programmed to:

in response to determining that the one or more fingers is performing the first predetermined operation, produce the details of the consideration information by voice output via the speaker.

6. A specimen inspection automation system which checks a specimen accommodated in a specimen container, comprising:

a processing device configured to perform one or more predetermined operations on the specimen;

a first processor programmed to control the processing device;

a database which stores consideration information about the specimen;

one or more holders configured to hold the specimen container accommodating the specimen, wherein each of the one or more holders has a label;

a smart device which includes a display screen, a camera, and a second processor, wherein the second processor is programmed to:

control the camera to capture ti first image including a first holder on which the specimen container that accommodates the specimen therein is installed, display the image on the display screen, recognize the label on the first holder in the first image, communicate information about the specimen container that accommodates the specimen in the first holder in the first image, determine whether a mark is to be given to the specimen container in the first image based on the consideration information stored in the database, in response to determining that the mark is to be given, add the mark to overlap the specimen container in the first image and update the display thereof on the display screen, recognize one or more fingers in the first image, determine whether the one or more fingers in the first image is performing a first predetermined operation or a second predetermined operation to the specimen container having the added mark in the first image, in response to determining that the one or more fingers is performing the first predetermined operation, display details of the consideration information in proximity to the added mark in the first image on the display screen, in response to determining that the one or more fingers is performing the second predetermined operation, send the consideration information to a laboratory information system or a hospital information system.

7. The specimen inspection automation system according to claim 6, wherein the consideration information is one or more of information about a necessity of re-inspection of the specimen, information about an existence of an uninspected item of the specimen, or information about an existence of a request for additional inspection of the specimen.

8. The specimen inspection automation system according to claim 6, wherein the second processor is further programmed to:

control the camera to capture a second image of the first holder, recognize the label of the first holder, determine that the specimen container is extracted from the first holder by an inspection technician in the second image, and communicate information about the specimen container extracted from the first holder in the second image with the consideration information in the database.

9. The automatic analysis device according to claim 1, wherein the first predetermined operation is a pinching of the specimen container, and the second predetermined operation is a pointing at the specimen container.

10. The specimen inspection automation system according to claim 8, wherein the second processor is further programmed to:

control the camera to capture a third image of a second holder containing the specimen container, recognize the label of the second holder in the third image, determine the specimen container in the second holder of the third image has been extracted from the first holder in the second image by the inspection technician and is installed on the second holder in the third image, communicate information about the specimen container in the second holder in the third image with the consideration information in the database to store measurement item information corresponding to the second holder.

11. The specimen inspection automation system according to claim 6, wherein the first predetermined operation is a pinching of the specimen container, and the second predetermined operation is a pointing at the specimen container.

* * * * *